Oct. 3, 1961 G. E. WOODIS 3,002,659
CREAM DISPENSER
Filed June 13, 1957
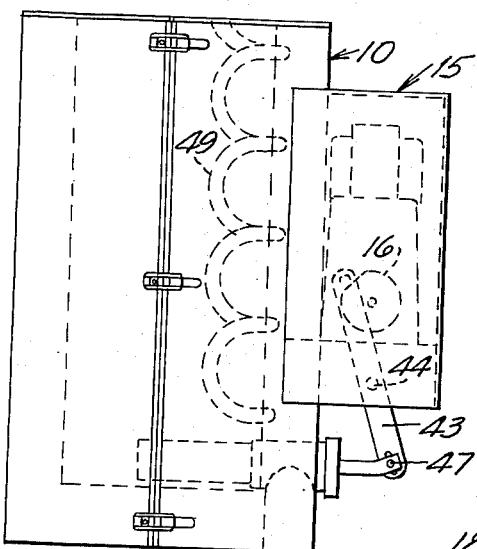
FIG. 1
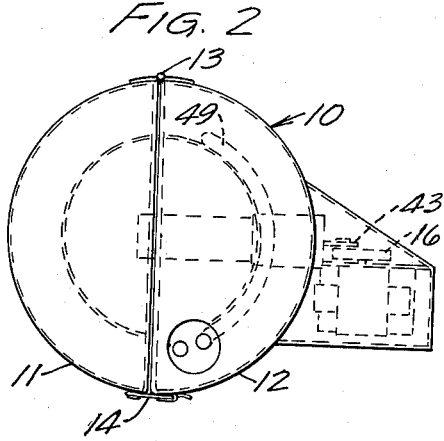
FIG. 2
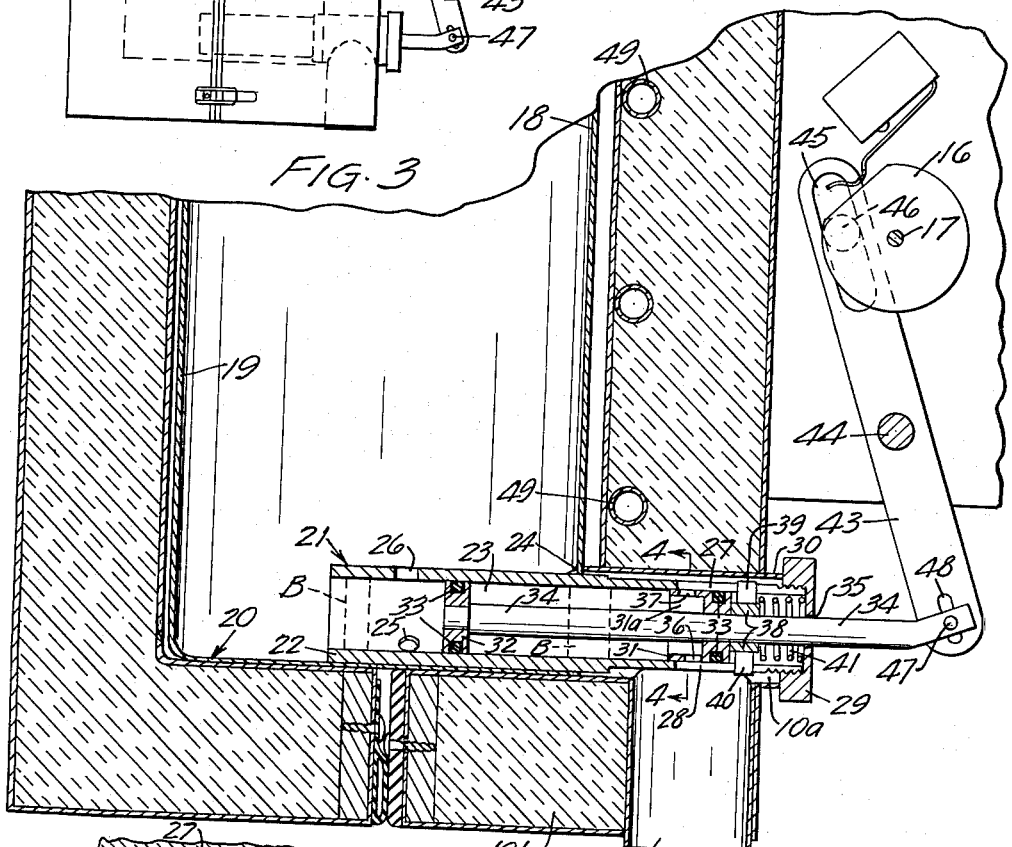
FIG. 3
FIG. 4
INVENTOR.
GEORGE E. WOODIS
BY
Williamson, Schroeder, Adams & Meyers
ATTORNEYS 3,002,659
Patented Oct. 3, 1961

3,002,659
CREAM DISPENSER
George E. Woodis, Minneapolis, Minn., assignor to Northwest Automatic Products Corporation, Minneapolis, Minn., a corporation of Minnesota
Filed June 13, 1957, Ser. No. 665,396
5 Claims. (Cl. 222—149)

This invention relates to dispensing mechanisms and more particularly relates to dispensers for cream and the like.

One of the major problems in dispensing cream in coffee vending machines and the like is caused by the propensity of cream to form a thin, but relatively strong film or skin if the cream, in small quantities, is allowed to be exposed to the air. For instance, if a droplet of cream remains in the aperture or nozzle through which the cream is disepnsed, the droplet may skin over and obstruct the aperture or nozzle opening. This may prevent the dispensing of cream, or on the alternative, may decrease the discharge rate so that a full measure of cream is not dispensed, if the dispensing is time controlled.

An object of my invention is to provide a new and improved apparatus of simple and inexpensive construction and operation for dispensing cream and the like.

Another object of my invention is the provision of a novel cream dispenser which causes a full measure of cream to be discharged each time the dispenser is operated.

A further object of my invention is the provision in a dispensing apparatus, of new and novel mechanism constructed to sweep through the entire discharge course for the cream each time the dispenser is operated so as to rutpure and substantially completely remove any obstructions to flow of cream which may be formed due to the cream skinning over and the like.

A still further object of my invention is to provide a novel insulated and cooled dispenser for cream or the like which confines the entire valve assembly so that the cream remains under refrigeration until it is discharged into a free-flowing stream.

These and other objects and advantages of my invention will more fully appear from the following description made in connection with the accompanying drawings wherein like reference characters refer to the same or similar parts throughout the several views and in which:

FIG. 1 is a side elevation view of the dispenser;
FIG. 2 is a top plan view of the dispenser;
FIG. 3 is a detail section view taken on a substantially vertical plane through the lower portion of the dispenser; and
FIG. 4 is a detail section taken on a vertical plane as indiacted substantially at 4—4 in FIG. 3.

One form of the present invention is shown in the accompanying drawings and is described herein. The dispenser includes a generally cylindrical insulating and cooling jacket or enclosure which is indicated in general by the numeral 10 and which is formed in two semi-circular sections 11 and 12 which are interconnected by means of a hinge 13 at one side and a latching mechanism 14 at the other side.

The dispenser also includes an operating mechanism which is indicated in general by numeral 15 and which includes a rotatable driving member 16 mounted on a rotary shaft 17 and powered for rotary movement by a suitable source of rotary power (not shown) within the operating mechanism 15.

As best seen in FIG. 3, the dispenser also includes a fluid supply container indicated in general by numeral 18 and consisting in a cylindrical wall 19 having an integrally formed bottom 20. The container 18 may have a removable cover to facilitate ready and easy filling thereof.

A fluid measuring and dispensing mechanism is indicated in general by the numeral 21 and is mounted in the container 18 adjacent the bottom 20. The measuring and dispensing mechanism 21 includes an elongated cylindrical housing 22 having an open interior 23 and being affixed in the sidewall 19 of the container 18 as by soldering or brazing at 24. The housing 22 which may be constructed of stainless steel or other non-corrosive material has an inner end portion with a plurality of inlet ports 25 and 26 respectively disposed adjacent the bottom and top of the housing. The outer end portion of housing 22 projects through an enlarged opening 10a in the insulated jacket 10 and has a pair of diametrically opposed upper and lower elongated slots 27 and 28 respectively which are oriented longitudinally of housing 22 and which open through the outer end thereof. The upper slot 27 is primarily an air inlet and the lower slot 28 is primarily a fluid outlet. A cap 29 is threadably mounted on the outer end of housing 22 and bears against the outer side 30 of jacket 10 to hold the housing 22 in the opening 10a and to hold the container 18 rigidly against the side of the jacket 10.

The measuring and dispensing mechanism also includes a pair of valve-forming pistons 31 and 32, both of which are provided with annular grooves containing O-rings 33 which engage and seal against the inner peripheral surface of the housing 22. Pistons 31 and 32 are rigidly affixed together by means of a shaft 34 to which the pistons are connected as by silver brazing. The shaft 34 projects through the piston 31 and also projects outwardly through a slide bearing-forming aperture 35 in cap 29. Piston 31 is slidable in the housing 22 and along the slot 28 so as to operate as a valve element controlling the discharge of fluid from the chamber 23 between the pistons and to this end, the piston or valve element 31 has a rearwardly or inwardly extending cylindrical wall 31a having a pair of upper and lower apertures 36 and 37 therein. Apertures 36 and 37 are all slightly reduced in diameter as compared to the width of slots 27 and 28, and are alignable with the slots when the piston or valve element 31 is moved to its outermost position seen in FIG. 3. As best seen in FIG. 3, the aperture 36 is disposed slightly forwardly or outwardly from the inner end of slot 28 when the piston 31 is drawn forwardly into the fluid discharging position thereof. The pistons 31 and 32 are movable between positions shown in full lines and the dotted positions B. It will be seen that the inner piston 32 moves forwardly and rearwardly across the inlet ports 25 and 26 as the valve mechanism is operated.

The dispensing and measuring mechanism 21 also includes means for rupturing and clearing any obstruction that may be formed in the discharge of the valve mechanism and more specifically in the outlet opening or slot 28. Such means include an apertured mounting block 38 slidably mounted on the outer portion of shaft 34 and having a pair of projections 39 and 40 extending upwardly and downwardly therefrom through the upper and lower slots 27 and 28 respectively. The projections 39 and 40 are free to move longitudinally in the slots and operate as wipers therein for clearing any obstructions that might be formed such as by cream droplets skinning over and the like. A spring 41 is disposed concentrically of shaft 34 between the cap 29 and the projections 39 and 40 and urges the projections 39 and 40 toward the inner ends of the slots 27 and 28, so that normally the projections 39 and 40 will rest against the inner ends of the slots.

The insulated bottom 10b of jacket 10 underlies the container 18 and has an enlarged downwardly opening flow discharge 42 communicating with the opening 10a and disposed below the inner end of slot 28 in housing 22. It will be seen that the passage 42 is substantially larger than the aperture 36 in the valve element or piston 31 so as to prevent the stream of fluid from engaging the sidewall of the passage 42.

The valve-operating mechanism 15 is connected to the outer end of shaft 34 by means of a swingable link 43 mounted on a pivot 44 which is supported from the frame. The upper end of link 43 has an elongated slot 45 therein through which the driving lug 46 extends. Lug 46 is affixed to the rotary drive member 16 to thereby produce a swinging movement of the link 43 as the member 16 is revolved. The outer end of shaft 34 is connected to the lower end of link 43 by means of a pivot pin 47 which extends through an elongated slot 48 in the link 43.

Means are provided in the jacket 10 for maintaining the fluid in container 18 at a predetermined temperature and in the form shown such means include coils 49 disposed in the stationary section 12 of the jacket 10 and adjacent the inner wall of the jacket so as to be in sufficient heat-transmitting relation with the container 18. Coils 49 may be connected to a suitable refrigerating mechanism (not shown) for maintaining the container 18 and the fluid therein in a cooled or refrigerated condition.

In operation, a quantity of fluid such as cream will be supplied into the container 18, and the coolant is circulated through the coils 49 for maintaining the cream in a refrigerated state. Normally the pistons 31 and 32 are disposed in the dotted line position B shown in FIG. 3 and it will be noted that the cream in the area between the pistons is confined completely within the inner periphery of the sidewall 19 of container 18 so as to be maintained in a cooled location. Only a minimum surface area of the valve mechanism is exposed to room temperature air and normally the circulation of air in the room will be restrained from substantially cooling the milk due to conduction of heat through the valve mechanism. The passage 42 through the bottom of the insulating jacket allows only a minimum of exposure of the valve housing to the room temperature air. When the pistons 31 and 32 are in the dotted positions B, the chamber 23 of housing 22 between the pistons is filled through the ports 25 and 26. It should be noted that the port 26 is disposed at the top of housing 22 so as to prevent any air from being entrapped within the chamber 23. Normally as the chamber 23 begins to fill, the cream will run inwardly through the port 25 and the air will escape upwardly through the port 26.

When the mechanism 15 is operated, the lower end of the lever 43 is swung outwardly, driving the shaft 34 outwardly through the housing 22. As the piston 31 is moved progressively outwardly, the piston engages the block 38 and moves the projections 39 and 40 along the slots 27 and 28. By movement of the projection 40 along the slot 28, any obstructions that may have formed in the slot 28, due to such causes as droplets of cream skinning over, will be ruptured and removed. The inner end portion of the slot 28 will thereby be fully open and unobstructed so as to allow a full stream of cream to be discharged through the slot 28 when the aperture 36 in the valve element or piston 31 is moved into alignment with the inner end of the slot 28. The entire quantity of cream contained in the chamber 23 between the pistons 31 and 32 will be quickly discharged in the stream of cream falling downwardly through the passage 42 into a suitable container such as a coffee cup. It should be noted that the entire outlet end of the housing, at least between the normal position B of the piston 31 and the inner end of slot 28, is swept clear of any obstructions by the projections 39 and 40 and by the piston 31.

After the chamber 23 has emptied, the mechanism 15 will drive the shaft 34 inwardly through the housing 22 so as to prevent flow communication between the outlet slot 28 and the chamber 23, and so as to move the piston 32 inwardly or rearwardly of the inlet ports 25 and 26, thereby allowing air in the chamber 23 to escape and allowing cream to again fill the chamber 23.

It will be seen that I have provided a new and improved cream dispenser wherein the outlet is swept clear of any obstructions which may have been formed as by cream droplets skinning over and the like and so as to permit the full measured quantity of cream to be quickly discharged.

It will further be seen that I have provided a novel dispenser for refrigerated liquids such as cream and the like, wherein only a minimum of the valve mechanism is exposed to room temperature air so as to facilitate maintenance of the cream in the dispenser at a predetermined temperature.

It will, of course, be understood that various changes may be made in the form, detail, arrangement and proportion of the parts without departing from the scope of my invention which consists of the matter described herein and set forth in the appended claims.

What I claim is:

1. A dispenser for fluids such as cream and the like, comprising a housing having an open interior and having a fluid inlet in communication with a fluid supply, said housing also having an elongated outlet slot spaced from the inlet, a projection extending through one end of the slot and being movable along the slot to clear any obstruction which may have formed in the slot as by cream skinning over and the like, a valve element in the housing and being movable longitudinally over one end of the slot into fluid discharging position, said valve element being operatively associated with said projection for movement along the slot therewith, and means for moving the valve element and projection along the slot and for delaying movement of the valve element into discharging position until the projection has moved along the slot, whereby the slot is cleared immediately before fluid is discharged through the slot so as to permit fluid to freely through the slot.

2. The invention set forth in claim 1 wherein said valve element has an elongated wall portion oriented in the housing for longitudinal movement along the slot, said wall portion having a fluid discharging aperture therethrough slightly smaller in width than the width of the slot and being alignable with the slot whereby to normally prevent the fluid from engaging the sides of the slot and thereby prevent accumulation of droplets of fluid across the slot as the fluid is discharged.

3. A dispenser for fluids and the like, comprising an elongated housing having an open interior and having a fluid inlet in communication with a fluid supply, said housing also having an elongated longitudinally oriented outlet slot spaced from the inlet and said slot having an inner end for discharging fluid supplied thereto from the inlet, a projection extending outwardly through the inner end of the slot and being movable along the slot to clear obstructions therefrom which may have been formed by droplets of cream skinning over and the like, a valve element in the housing and normally disposed between the inlet and outlet slot to prevent fluid discharge through the outlet slot, said valve element being reciprocable in the housing and along the inner end of the outlet slot to permit fluid discharge through the slot, said valve element having operative connection with the projection for moving the same along the slot as the valve element approaches the slot toward fluid discharging relation and means for moving the valve element and projection in the housing, whereby fluid may freely flow through the outlet slot when the valve element is moved longitudinally therealong and the projection is moved through the slot to clear flow obstructions therefrom.

4. A dispenser for fluids such as cream and the like, comprising a housing having an open interior and having a fluid inlet in communication with a fluid supply, a valve mechanism in said housing and including a valve element movably mounted in the housing to permit discharge of fluid, and said housing having a downwardly directed outlet adjacent the valve element, the outlet having an inner end and an outer end, an upright projection extending through the outlet and extending outwardly from said inner end to and beyond said outer end and said projection being movable in the outlet at both the inner and outer ends thereof to rupture any obstruction that may be formed therein as by skinning over of cream and the like, said projection being connected with the valve element for movement in the outlet in response to movement of the valve element whereby to permit free flowing of the fluid through the outlet.

5. A dispenser for fluids such as cream and the like, comprising a housing having an open interior and having a fluid inlet in communication with a fluid supply, said housing also having a downwardly opening outlet from which a stream of fluid is dispensed into air, a flow control valve element in said housing and being movable over said outlet into fluid discharging position, a projection extending through the outlet and movable thereacross to clear skinned-over cream from the outlet, means movably mounting and retaining said projection in the outlet and also being connected with the valve element for moving said element into and out of fluid discharging position, said means moving said projection across the oulet to clear the same as said valve element is moved toward fluid discharging position, whereby to positively clear the outlet and permit a stream of fluid to freely flow therethrough.

References Cited in the file of this patent

UNITED STATES PATENTS

| | | |
|---|---|---|
| 1,330,422 | Bausman | Feb. 10, 1920 |
| 1,870,188 | Abrams | Aug. 2, 1932 |
| 1,892,547 | Benham et al. | Dec. 27, 1932 |
| 2,237,189 | McCormick et al. | Apr. 1, 1941 |
| 2,291,256 | Rehrig et al. | July 28, 1942 |
| 2,321,869 | Stanyer | June 15, 1943 |
| 2,433,054 | Lime | Dec. 23, 1947 |
| 2,464,030 | Engstrom | Mar. 8, 1949 |
| 2,754,995 | Switzer | July 17, 1956 |
| 2,801,031 | Hunter | July 30, 1957 |

FOREIGN PATENTS

| | | |
|---|---|---|
| 830,598 | Germany | Feb. 7, 1952 |